US006175595B1

(12) United States Patent
Keesman

(10) Patent No.: US 6,175,595 B1
(45) Date of Patent: *Jan. 16, 2001

(54) METHOD AND DEVICE FOR DECODING DIGITAL VIDEO BITSTREAMS AND RECEPTION EQUIPMENT INCLUDING SUCH A DEVICE

(75) Inventor: Gerrit J. Keesman, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/683,393

(22) Filed: Jul. 18, 1996

(30) Foreign Application Priority Data

Jul. 19, 1995 (EP) ................................. 95401717

(51) Int. Cl.[7] ...................................................... H04N 7/12
(52) U.S. Cl. .............................. 375/240.25; 348/385.1; 348/388.1
(58) Field of Search ................................... 348/390, 384, 348/385, 387, 388, 397, 399, 400, 6–7, 12–13, 16; 455/3.1–3.2, 4.2, 5.1; 370/468, 498, 536, 537, 538, 540, 542, 544

(56) References Cited

U.S. PATENT DOCUMENTS

| 5,029,014 | * | 7/1991 | Lindstrom ............................. 386/106 |
| 5,343,250 | * | 8/1994 | Iwamura ............................... 348/400 |
| 5,361,098 | * | 11/1994 | Lucas .................................... 348/568 |
| 5,502,493 | * | 3/1996 | Meyer ................................... 348/845 |
| 5,592,398 | * | 1/1997 | Terauchi et al. ...................... 370/535 |
| 5,594,492 | * | 1/1997 | O'Callaghan et al. ................. 348/10 |
| 5,719,641 | * | 2/1998 | Mizoguchi ............................ 348/607 |
| 5,724,091 | * | 3/1998 | Freeman et al. ........................ 348/13 |
| 5,790,177 | * | 8/1998 | Kassatly ................................. 348/13 |
| 5,815,502 | * | 9/1998 | Saito et al. ............................. 348/385 |
| 5,861,881 | * | 1/1999 | Freeman et al. ...................... 345/302 |
| 5,949,476 | * | 9/1999 | Pocock et al. ......................... 348/24 |
| 5,953,046 | * | 9/1999 | Pocock .................................. 348/12 |

FOREIGN PATENT DOCUMENTS

| 0566092 | 10/1993 | (EP) . |
| 5-328344 | 12/1993 | (JP) . |
| WO 95/28795 | 10/1995 | (WO) . |

OTHER PUBLICATIONS

"MPEG: A Video Compression Standard for Multimedia Applications", by D. Le Gall, Communications of the ACM, pp. 46 to 58, vol. 34, No. 4 (Apr. 1991).

* cited by examiner

Primary Examiner—Vu Le
(74) Attorney, Agent, or Firm—Laurie E. Gathman

(57) ABSTRACT

Decoding method and device with which it is proposed, in order to reduce the switching time from one among n input digital video bitstreams corresponding to n programs to another one, to use under the supervision of control means (30) including a control unit (31) and a switch (32), while a selected digital video bitstream is presented for decoding and display, (n-1) buffers (22, 23) for the (n-1) extra bitstreams, these extra buffers being dimensioned so that they always comprise at least an intra frame, and preferably the most recent one, of each incoming extra bitstream. In a simpler embodiment where the next program switched to is one up or one down, only one or two extra buffers are necessary, subject to the knowledge of an information on how the incoming programs may be accessed, i.e. according to some defined order.

18 Claims, 2 Drawing Sheets

METHOD AND DEVICE FOR DECODING DIGITAL VIDEO BITSTREAMS AND RECEPTION EQUIPMENT INCLUDING SUCH A DEVICE

BACKGROUND OF THE INVENTION

The present invention relates to a method of decoding a bitstream including a plurality of multiplexed digital video bitstreams corresponding to previously coded signals, said method comprising in cascade the steps of:
receiving n digital video bitstreams in the form of a single multiplexed bitstream originating from previous transmitting and/or storage means;
selecting one single digital video bitstream for display; and
decoding the selected digital video bitstream.

The invention also relates both to a device for decoding a bitstream including a plurality of multiplexed digital video bitstreams corresponding to previously coded signals, said device comprising:
means for receiving n digital video bitstreams in the form of a single multiplexed bitstream originating from previous transmitting and/or storage means and demultiplexing said multiplexed bitstream;
storing means;
means for selecting one single digital video bitstream for display; and
means for decoding the selected digital video bitstream, and to a reception equipment comprising such a decoding device.

This invention finds an application in the field of television (standard, high definition, or interactive television for instance), and particularly in the field of video terminals or receivers based on the MPEG standard.

The european patent application no. 0566092 describes an apparatus for decoding compression-coded moving picture signals, comprising, in one of the proposed embodiments, a single decoder provided for decoding an input bitstream composed of multiplexed coded signals corresponding to independent original sequences of images. This apparatus associates to said decoder control means allowing to reconstruct and display from the output signals of the decoder the pictures corresponding to one of the original video sequences. However, the method carried out in such an apparatus does not take into account the problems which appear in case of switching from a sequence to another one and, more particularly, the troublesome factors which considerably increase the waiting time for pictures from the new video sequence.

SUMMARY OF THE INVENTION

It is therefore a first object of the invention to propose a method of decoding a bitstream including a plurality of multiplexed digital video bitstreams which allows to switch fast from one of the coded bitstreams to another one.

To this end, the invention relates to a method as defined in the preamble of the description, in which said coded digital signals correspond at least to frames, said intra, which are coded without any reference to any other previous frames, the selected digital video bitstream being presented for decoding and display and coded signals corresponding to an intra frame of at least one of the (n-1) other bitstreams being stored for immediate access by the viewer.

In a particular application of the method, said coded digital signals correspond to frames, said intra, which are coded without any reference to any other frame or to frames said predicted or interpolated according to the fact that, in agreement with the MPEG standard, they are respectively predicted by motion-compensated prediction from an earlier intra or predicted frame or bidirectionally interpolated from an earlier and a later frame, the selected digital video bitstream being presented for decoding and display, and at least the coded signals corresponding to an intra frame of at least one of the (n-1) other bitstreams being stored for immediate access by the viewer.

By implementing this decoding method, especially in the case of coded signals being in agreement with the MPEG standard, switching is thus considerably faster than when a conventional decoder is used. Preferably said stored coded signals are the most recently received intra frame, rather than storing the whole bitstream representing a given period of time. A picture is then displayed nearly instantaneously upon switching to an other video sequence.

In more sophisticated implementations, said stored coded signals belong to the two bitstreams corresponding to the most immediate access by the viewer, or, more generally, to the (n-1) other bitstreams.

It is another object of the invention to propose a device for decoding multiplexed digital video bitstreams which allows to implement said decoding method.

To this end, the invention relates to a device as defined in the preamble of the description and in which said coded digital signals correspond at least to frames, said intra, which are coded without any reference to any other previous frame, and said storing means comprise, while the selected digital video bitstream is presented for decoding and display, a buffer for storing coded signals that correspond to an intra frame of at least one of the (n-1) other bitstreams, for immediate access by the viewer.

Notwithstanding the increase of the size of the physical memory, the access delay in case of switching on from one input bitstream to another is considerably reduced, which is considered as very advantageous by the consumers. Only a residual waiting time is to be observed before the concerned sequence begins to exhibit motion.

Obviously the invention also relates, in a particular embodiment, to a decoding device in which said coded digital signals correspond to frames, said intra, which are coded without any reference to any other frame or to frames said predicted or interpolated according to the fact that, in agreement with the MPEG standard, they are respectively predicted by motion-compensated prediction from an earlier intra or predicted frame or bidirectionally interpolated from an earlier and a later frame, and said storing means comprise, while the selected digital video bitstream is presented for decoding and display, a buffer for storing at least the coded signals corresponding to an intra frame of at least one of the (n-1) other bitstreams, for immediate access by the viewer.

In other embodiments, said storing means may comprise two parallel buffers for storing at least the coded signals corresponding to an intra frame of the two bitstreams corresponding to the most immediate access by the viewer, or more generally (n-1) parallel buffers for storing at least the coded signals corresponding to an intra frame of each of the (n-1) other bitstreams.

Preferably said buffer(s) is (are) provided for storing within each of said bitstream(s) the most recently received intra frame. Moreover, the buffers may together constitute a single physical memory.

It is still another object of the invention to propose a reception equipment including such a decoding device.

To this end, the invention relates to a reception equipment comprising a decoding device such as indicated above and provided in the form of a sub-assembly which comprises the following circuits:

a demultiplexer, provided for separating the input multiplexed bitstream into n respective demultiplexed digital video bitstreams corresponding to original sequences, of images;

parallel buffers;

a selector provided for enabling said viewer to select for decoding and display one of said bitstreams stored in one buffer, only a limited part of the other non-selected demultiplexed bitstreams being stored within the (n-1) other buffers, and said limited part being at least the coded signals corresponding to a previous intra frame of each bitstream;

a decoder of said selected bitstream;

display means, in the form of a screen of a television set.

Preferably, said sub-assembly and said television set constitute one single apparatus.

BRIEF DESCRIPTION OF THE DRAWINGS

These and other aspects of the invention will be apparent from and elucidated with reference to the embodiments described hereinafter and considered in connection with the accompanying drawings, wherein.

DETAILED DESCRIPTION OF THE PREFERRED EMBODIMENTS

A typical video compression scheme based on variable length coding and motion compensation, for instance a compression scheme according to the international video standard MPEG, processes digital signals corresponding to images according to the main following steps: orthogonal transform of these signals (such as discrete cosine transform), quantization, variable length coding, memorization, and (in a backward connection) picture prediction by motion estimation and compensation. Reciprocally, a corresponding decoding scheme, and particularly an MPEG decoder, implements the following steps: memorization of the input coded bitstream, variable length decoding, inverse quantization, inverse orthogonal transform, and reconstruction of pictures by motion-compensated prediction.

Such a decoding scheme concerns the situation where only one digital coded bitstream has been transmitted and/or stored and is now received for decoding. When the incoming input signals correspond to several sequences or programs embedded in a single large bitstream with possible switching from one sequence or program to another one, switching on to another bitstream (another television program, another interactive video sequence, and so on, according to the activity of the user) will in fact take some time. According for instance to the MPEG standard, described in many documents and for example in the article "MPEG: A Video Compression Standard for Multimedia Applications", D. Le Gall, Communications of the ACM, April 1991, vol.34, no. 4, pp.46–58, it is indeed known that the sequence of transmitted and/or stored signals includes periodically spaced intra pictures, i.e. pictures coded without using information from any other picture and which can therefore be considered as reference pictures (providing for example access points for random access). At the time of switching, an access delay corresponding to the waiting time for an intrapicture to occur cannot be avoided.

Moreover, in such switching situations, the waiting time for pictures from the new video bitstream to be available also depends on other factors, such as the time to wait until the input buffer is loaded to the correct filling level before the decoding process can start, the time for reversing the picture order (the coded signals also include predicted pictures obtained by bidirectional interpolation from a previous and a following picture, and therefore decoded only after said corresponding following picture is available at the reception side), and the time to decode a picture.

Figure 1:
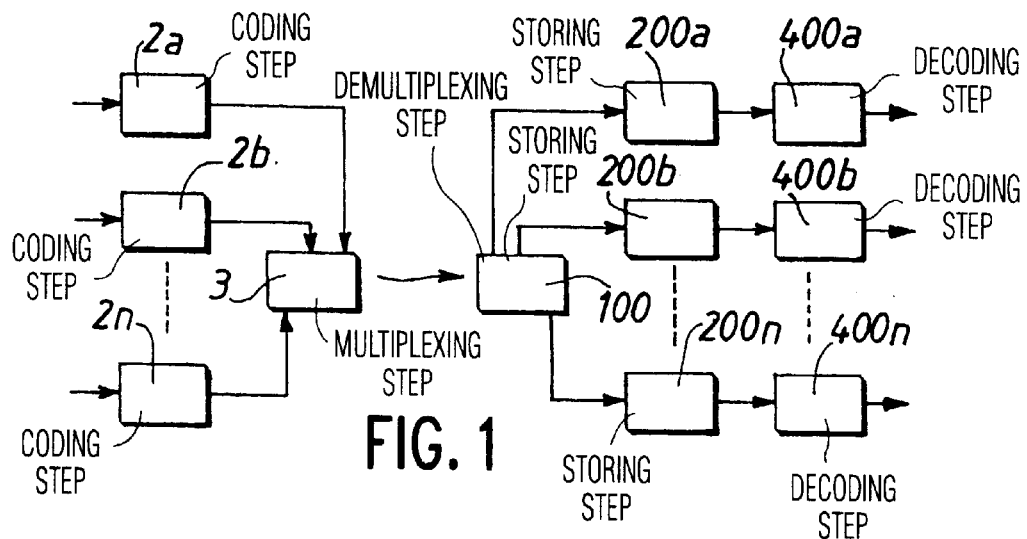
FIG. 1 is a schematical illustration of a conventional video coding and decoding scheme.

Referring to FIG. 1, there is very schematically illustrated a video coding scheme provided for implementing n parallel coding steps 2a to 2n followed by a multiplexing step 3 (this number n may be for example equal to 3). After transmission (and/or storage), a corresponding decoding scheme is provided for implementing a demultiplexing step 100 of the received coded bitstream, followed by n storing steps 200a to 200n and n decoding steps 400a to 400n. According to this decoding method, the demultiplexing step is provided for separating within the single large input coded bitstream the plurality of multiplexed bitstreams.

The proposed decoding method comprises in cascade the steps of receiving n digital video bitstreams in the form of a single multiplexed bitstream originating from previous transmitting and/or storage means, selecting one single digital video bitstream, and decoding the selected digital video bitstream. Moreover, the coded digital signals correspond to frames, said intra, which are coded without any reference to any other previous frames, and, while the selected digital video bitstream is presented for decoding and display, the coded signals corresponding to an intra frame of at least one of the (n-1) other bitstreams are stored for allowing as soon as requested an immediate access by the viewer.

Thanks to that organization in parallel operations using one or a plurality of buffers, it is possible to reduce the switching time: upon switching from one program or sequence to another, there is indeed no longer need to wait until an intra picture arrives and the corresponding buffer has the desired occupancy.

Figure 2:
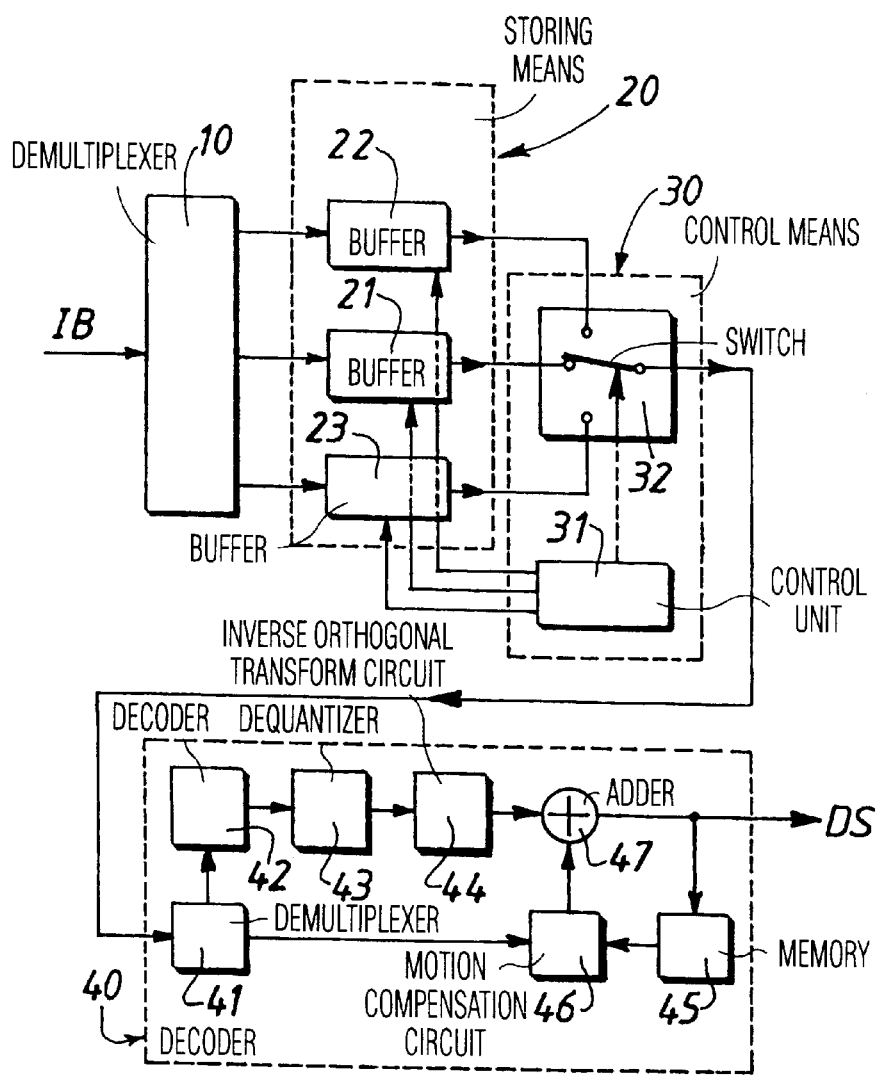
FIG. 2 shows an embodiment of a device carrying out the decoding method according to the present invention.

This principle of the invention can be implemented for instance according to the embodiment of FIG. 2: the decoding device shown in this figure comprises a demultiplexer 10 which receives an input bitstream IB including a plurality (generally n, only three in the represented embodiment) of individual video bitstreams and the outputs of which (three in the case of FIG. 2) are sent to storing means 20 comprising in this embodiment the same plurality of buffers 21 to 23 (three in this example).

A viewer switching action may occur in a control unit 31 provided for selecting the buffer corresponding to the selected bitstream which will be decoded, for instance the buffer 21, and at the same time for controlling the transfer of the two other bitstreams (which at that moment have not to be decoded, since none of them has been selected by a viewer action) towards the two other buffers 22 and 23. At the outputs of parallel buffers 21 to 23, a switch 32 controlled by the control unit 31 with which it constitutes control means 30 selects the appropriate buffer output signal and sends it towards a decoder 40. This decoder comprises for example a demultiplexer 41 (provided for separating the signals to be decoded and associated motion vectors), a variable length decoder 42, a dequantizer 43, an inverse orthogonal transform circuit 44, and a prediction circuit comprising a memory 45, a motion compensation circuit 46 (receiving from the demultiplexer 41 the motion vectors), and an adder 47 which adds the outputs of the motion compensation circuit 46 and the inverse orthogonal transform circuit 44 and yields the output decoded signals DS to be displayed (such a decoder is conventional and will not be described in a more detailed manner).

The buffers 22 and 23 receive the respective bitstreams and store a limited part of each one, including at any moment at least an intra frame. Therefore, upon switching from a bitstream to another, an intra frame of this other selected bitstream is already ready to be decoded, and the viewer has no longer to wait for another displayed signal (in case of a conventional MPEG system and a frame frequency of 25 Hz, only each 12th picture corresponds to an intraframe, which corresponds to a waiting time of $^{12}/_{25}$=0.48 seconds).

The invention is obviously not limited to the embodiment described hereinbefore, from which variations or improvements may be conceived without departing from the scope of the invention. It should for instance be noted that, especially with respect to the control means, the proposed implementation of the invention may be partly in the form of the execution of a series of programmed instructions the performance of which is for example ensured by a microprocessor.

Figure 3:
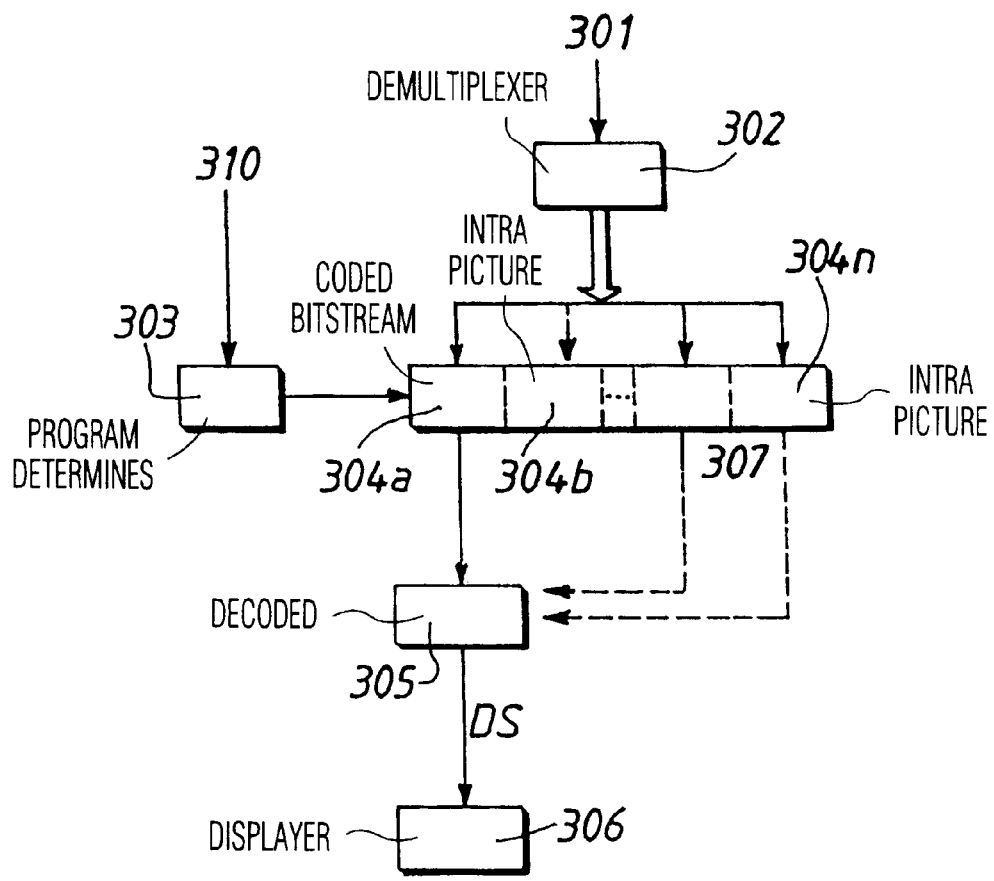
FIG. 3 is an example of a software program convenient for an implementation of the invention.

An example of a software program for such an implementation is illustrated in FIG. 3, that shows a flowchart detailing the reception process of the input coded bitstream (in relation with the embodiment of FIG. 2 for the explanations). The coded information is first received at 301 (this reference corresponds to the input of the demultiplexer 10), in the form of the coded bitstream corresponding, before transmission and/or storage, to the original digital signals from the n parallel channels (see the coding scheme of FIG. 1). The received coded bitstream is demultiplexed (sub-step 302). The program then determines (sub-step 303) which particular bitstream has to be selected, upon the indication from a television viewer 310, and this coded bitstream is stored if necessary (sub-step 304a), and then decoded (sub-step 305) and displayed (sub-step 306), the output decoded signals being referenced DS in FIGS. 2 and 3. In the same time a limited part of each of the bitstreams which have not been selected for decoding, including at least an intra picture, is maintained (sub-steps 304b, . . . , 304n) in a place of the buffers in which these limited parts are ready to be transferred out of these buffers (if necessary, i.e. upon switching from the previously selected bitstream to another one) for an immediate access by the viewer. Therefore, when such a situation occurs, the stored intra frame of this newly selected bitstream can be immediately read (sub-step 307), decoded (sub-step 305) and displayed (sub-step 306), as already explained, without any waiting time. The cycle of demultiplexing, storing and decoding the bitstream is then repeated.

Figure 4:
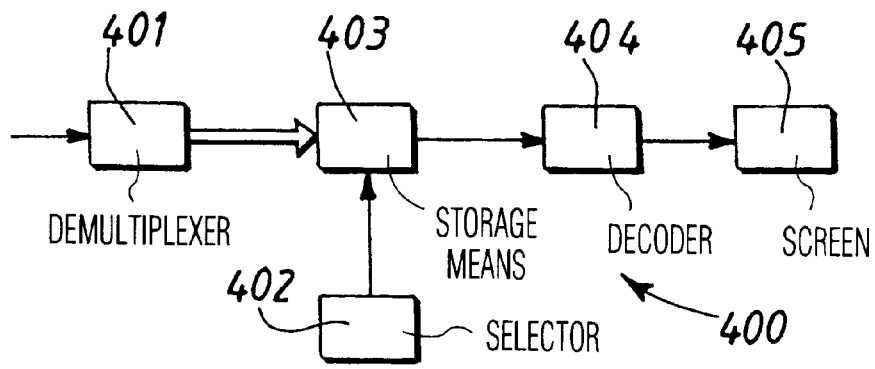
FIG. 4 shows a simplified representation of a video reception sub-assembly performing the steps of the method according to the invention.

Moreover, the invention also relates to a reception equipment for implementing the above-indicated operations. There is illustrated in FIG. 4 a simplified representation of a video reception sub-assembly 400 that performs the steps of the method according to the invention. Such a reception sub-assembly is connected (at viewer's home or place) between an antenna or cable outlet and a conventional television set, or preferably incorporated inside the television set.

As already explained, the incoming bitstream corresponds (at the side of the transmitter) to coded multiplexed signals associated to n parallel channels and corresponding to original images. The video reception apparatus 400 includes a demultiplexer 401 that separates the input coded bitstream in respective digital video bitstreams corresponding to each of the respective original sequences of images. A selector 402 enabling the viewer to select any desired channel allows to select the corresponding bitstream which has been stored in one of the buffers of storage means 403. From the other non-selected demultiplexed bitstreams, only a limited part, for example a previous or the preceding intra picture, is stored. At the output of the storage means 403, a decoder 404 performs a data decompression corresponding to the compression carried out at the side of the transmitter and carries out the reconstruction of pictures which are then displayed on the screen 405 of the concerned television set.

Another improvement, concerning an alternative fast switching embodiment may also be as follows. Rather than storing a predetermined period of time of each bitstream in at least one or in the (n-1) extra buffers not concerned at a given moment by the decoding step, only the most relevant part thereof may be stored. For instance, only a recently received, or the most recently received, intra frame of each bitstream is stored, which leads to the fact that a picture is now displayed nearly instantaneously, only a short waiting time being observed before the program starts to exhibit motion.

It must also be indicated that the various buffers are either distinct or may constitute a single physical memory. In all the cases, the required buffer size BS for the extra buffers depends on the bitrate and the frequency of the intra frames within the bitstreams:

$$BS=((N/f_F).R)+BD$$

where: N=number of pictures within a group of pictures (i.e every Nth picture is an intra one);

$f_F$=frame frequency;

R=bitrate;

BD=size of the decoder buffer.

Therefore, if N=12 and the bitrate value is 5 Megabits/sec., extra buffers of $((^{12}/_{25})\times 5)+1.8=4.2$ Mbits/s are desired (the value 1.8 Mbit/s being here the input buffer size as specified in MPEG main profile: for higher bitrates, a larger buffer is obviously required, with a maximum buffer size of 9 Mbits for a bitrate of 15 Mbits/s which is the maximum value in MPEG main profile at main level).

It can still be noticed that simpler implementations of the decoding method and device are possible. For instance, in the case of switching to another incoming TV program, it is most likely that the next program switched to is either one up or one down, which allows to provide for only two parallel operations in place of n, the first one for decoding the signals of the selected bitstream and displaying them and the other for storing, within the other bitstream which corresponds to the next possible selection by the viewer (it is indeed now required, in the case of this simpler implementation, that an information is available on how the incoming programs may be accessed, i.e. according to which defined order), at least the coded signals corresponding to an intra frame. Alternatively, said second storing operation may concern two bitstreams, corresponding to the two nearest possible selections according to the viewer decision.

What is claimed is:

1. A method of decoding a bitstream which includes a plurality of multiplexed coded bitstreams corresponding to previously coded signals, said method comprising the steps of:

receiving n (n≧2) coded bitstreams in a single multiplexed bitstream originating from a transmitting means and/or, a storage means, and demultiplexing to obtain the n individual coded bitstreams;

storing only one intra-picture frame of each of the n coded bitstreams in n respective memory buffers which intra picture frame has been coded without reference to other frames in the coded bitstreams;

selecting, for display, a single coded bitstream from one of the n memory buffers; and decoding the selected coded bitstream with a single decoder, using the intra-picture frame stored in the one of the n memory buffers corresponding to the selected coded bitstream.

2. A method according to claim 1, wherein said coded bitstreams are coded using the MPEG standard; and wherein the decoding step includes generating predictive-picture frames based on the at least one intra-picture frame, the predictive-picture frames being generated by (i) using motion-compensation to predict the predictive-picture frames based on an earlier intra-picture frame or an earlier predictive-picture frame, or (ii) bi-directionally interpolating the predictive-picture frames based on an earlier frame and a later frame.

3. A method according to claim 1, wherein the intra-picture frame stored in the n memory buffers is a most recently received intra-picture frame.

4. A method according to claim 1, wherein n has a value of two, and wherein the intra-picture frames stored in two memory buffers are accessible by a viewer in the selecting step.

5. A method according to claim 1, wherein, during the decoding step, unselected intra-picture frame stored in respective memory buffers remain stored therein.

6. A method according to claim 1, further comprising the step of:

displaying an image based on the selected coded bitstream; and selecting, for display, a second coded bitstream from another one of the n memory buffers immediately following decoding of a first selected coded bitstream in the decoding step.

7. The method in accordance with claim 1 wherein the step of storing stores a plurality of intra-picture frames.

8. A device for decoding a bitstream which includes a plurality of multiplexed coded bitstreams corresponding to previously coded signals, said device comprising:

receiving means for receiving n (n≧2) coded bitstreams in a single multiplexed bitstream originating from a transmitting means and/or a storage means, and for demultiplexing said single multiplexed bitstream in order to output the n coded bitstreams;

n memory buffers for storing one intra-picture frame of each of the n coded bitstreams respectively which intra-picture frame has been coded without reference to other frames in the coded bitstream;

selecting means for selecting, for display, a single coded bitstream from one of the n memory buffers; and decoding means for decoding the selected coded bitstream with a single decoder, using the intra-picture frame stored in the one of the n memory buffers corresponding to the selected coded bitstream.

9. A device according to claim 6, wherein said coded bitstreams are coded using the MPEG standard; and wherein the decoding means includes generating means for generating predictive-picture frames based on the intra-picture frame, the generating means generating the predictive frames by (i) using motion compensation to predict the predictive-picture frames based on an earlier intra-picture frame or an earlier predictive-picture frame, or (ii) bi-directionally interpolating the predictive-picture frames based on an earlier frame and a later frame.

10. A device according to claim 9, wherein said n memory buffers comprise parts of a single physical memory.

11. A device according to claim 8, wherein the n memory buffers comprise two parallel buffers which store a most-recently received intra-picture frame from a respective one of two coded bitstreams.

12. A device according to claim 8, wherein the n memory buffers comprise n parallel buffers which are accessible by a viewer via the selecting means.

13. A device according to claim 8, wherein, while the decoder is decoding the selected coded bitstream, unselected intra-picture frame stored in respective memory buffers remain stored therein.

14. A device according to claim 8, further comprising:

display means for displaying an image based on the coded bitstream selected by the selecting means;

wherein the selecting means selects, for display, a second intra-picture from another one of the n memory buffers immediately following decoding of a first selected coded bitstream by the decoder.

15. The device in accordance with claim 8 wherein the n memory buffers store a plurality of intra-picture frames.

16. Video reception equipment for receiving and displaying images transmitted as a single coded bitstream, a video reception equipment comprising:

a demultiplexer for separating the single coded bitstream into n respective demultiplexed bitstreams corresponding to original sequences of images;

n parallel memory buffers for storing one intra-picture frame of each of the n demultiplexed bitstreams, respectively which intra-picture frame has been coded without reference to other frames in the coded bitstreams;

a selector for enabling a viewer to select, for decoding and display, one of said demultiplexed bitstreams which are stored in part in one of the n parallel memory buffers;

a single decoder for decoding any selected one of the demultiplexed bitstreams, using the intra-picture frame stored in the memory buffer corresponding to the selected bitstream; and a display means for displaying an image based on the demultiplexed bitstream decoded by the decoder.

17. Video reception equipment according to claim 16, wherein said display means comprises a television set.

18. The video reception equipment in accordance with claim 16, wherein the n parallel memory buffers store a plurality of intra-picture frames.

* * * * *

UNITED STATES PATENT AND TRADEMARK OFFICE
CERTIFICATE OF CORRECTION

| | | |
|---|---|---|
| PATENT NO. | : 6,175,595 B1 | Page 1 of 1 |
| APPLICATION NO. | : 08/683393 | |
| DATED | : January 16, 2001 | |
| INVENTOR(S) | : Gerrit J. Keesman | |

It is certified that error appears in the above-identified patent and that said Letters Patent is hereby corrected as shown below:

In claim 1, line 5, the parenthetical expression should read "$(n \geq 2)$".

In claim 8, line 4, the parenthetical expression should read "$(n \geq 2)$".

Signed and Sealed this

Eighteenth Day of October, 2011

David J. Kappos
*Director of the United States Patent and Trademark Office*